(12) United States Patent
Kish et al.

(10) Patent No.: US 10,209,876 B2
(45) Date of Patent: Feb. 19, 2019

(54) METHOD AND APPARATUS FOR PROVIDING A SEGMENTED SCROLLBAR

(71) Applicant: HERE GLOBAL B.V., Eindhoven (NL)

(72) Inventors: Steven Kish, San Francisco, CA (US); Brody Larson, San Mateo, CA (US); Nicole Ryan, San Francisco, CA (US); Pascal Wever, Los Angeles, CA (US); Charlie Sutton, San Francisco, CA (US); Oliver Farshi, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 503 days.

(21) Appl. No.: 14/540,166

(22) Filed: Nov. 13, 2014

(65) Prior Publication Data

US 2016/0139793 A1    May 19, 2016

(51) Int. Cl.
  *G06F 3/0484*   (2013.01)
  *G06F 3/0485*   (2013.01)

(52) U.S. Cl.
  CPC ...... *G06F 3/04855* (2013.01); *G06F 3/04842* (2013.01)

(58) Field of Classification Search
  CPC .................. G06F 3/04855; G06F 3/04842
  See application file for complete search history.

(56) References Cited

U.S. PATENT DOCUMENTS

| | | | |
|---|---|---|---|
| 5,526,480 A | 6/1996 | Gibson | |
| 5,973,663 A * | 10/1999 | Bates | G06F 3/04855 715/205 |
| 7,490,297 B2 * | 2/2009 | Bates | G09G 5/14 715/764 |
| 7,774,703 B2 * | 8/2010 | Junuzovic | G06Q 10/10 715/229 |
| 7,774,718 B2 | 8/2010 | Finke-Anlauff et al. | |
| 8,205,168 B1 | 6/2012 | Van Slembrouck | |

(Continued)

OTHER PUBLICATIONS

Lyle, Andrew; "Review: Windows Live Essentials Photo Gallery", [online] Retrieved from the Internet: <URL: http://www.neowin.net/news/review-windows-live-essentials-2011---photo-gallery>. (Oct. 2, 2010) 5 pages.

(Continued)

*Primary Examiner* — Shourjo Dasgupta
(74) *Attorney, Agent, or Firm* — Alston & Bird LLP

(57) ABSTRACT

A method, apparatus and computer program product are provided to facilitate the identification of one or more media files within a gallery of media files presented upon a display. In the context of a method, a gallery of media files is caused to be displayed. The gallery of media file is grouped into a plurality of sessions. Each session includes one or more media files. The method also causes display of a scrollbar partitioned into a plurality of segments. Each segment corresponds to a respective session of media files. The method further includes determining the media files of the gallery to be displayed in response to user input selecting a respective segment of the scrollbar. In this regard, the method determines the media files of the gallery to be displayed by determining the media files of the session corresponding to the respective segment of the scrollbar that is selected.

17 Claims, 6 Drawing Sheets

(56) References Cited

U.S. PATENT DOCUMENTS

| | | |
|---|---|---|
| 8,392,848 B2 | 3/2013 | Gould |
| 2010/0077353 A1* | 3/2010 | Moon .................. G06F 3/0482 |
| | | 715/832 |
| 2011/0248166 A1* | 10/2011 | Diem ................ H01L 27/14649 |
| | | 250/330 |
| 2014/0003516 A1* | 1/2014 | Soroushian ........ H04N 21/2387 |
| | | 375/240.13 |
| 2014/0009490 A1 | 1/2014 | Gardenfors |
| 2014/0033099 A1 | 1/2014 | Treitman et al. |
| 2014/0215386 A1* | 7/2014 | Song .................. G06F 3/04855 |
| | | 715/787 |

OTHER PUBLICATIONS

U.S. Appl. No. 14/245,454, filed Apr. 4, 2014, In re: Sarasmo entitled *Accessory Identification and Configuration and Corresponding Accessory*.

* cited by examiner

METHOD AND APPARATUS FOR PROVIDING A SEGMENTED SCROLLBAR

TECHNOLOGICAL FIELD

An example embodiment of the present invention relates generally to a user interface including a scrollbar for scrolling through a gallery of media files and, more particularly, to a method and apparatus for providing segmented scrollbar to permit scrolling through respective sessions of media files.

BACKGROUND

An increasing number of media files, such as still images and video files, are being captured and stored. This increase in the number of media files may be attributable, at least in part, to the proliferation of mobile devices, such as smartphones, tablet computers or the like, that include cameras that are intuitive to use and that capture relatively high quality images. Because of the widespread availability of mobile devices including cameras, users are quick to capture media files, such as still images or video files, of a wide variety of events that occur both in everyday life and on special occasions.

Because of the proliferation of media files, the number of media files stored on a computing device, such as a mobile device, may sometimes be substantial. A user may wish to locate a particular media file or, alternatively, may wish to locate all of the media files captured during a particular occasion. In an effort to locate the media file(s) of interest, a gallery of media files may be presented upon the display of the computing device through which the user may scroll. Even though the media files may be arranged in chronological order, the number of media files in the gallery may make the task of locating a respective media file cumbersome.

In an effort to reduce the time required to locate a media file by scrolling through the gallery of media files in a continuous manner, a user may select a point along a scrollbar and the media files that are associated with the selected point along the scroll bar may be displayed. However, this process is oftentimes inexact in that even though the media files may be arranged in a chronological order, the point along the scrollbar that is selected by the user may actually be well in advance of or subsequent to the date on which the media file of interest was captured since the user, at the time of the selection, will be unaware of any correlation between the date associated with the point along the scrollbar that is selected by the user and the date on which the media file of interest was captured. In the frequent instance in which the media files associated with the point selected by the user along the scrollbar are in advance of or subsequent to the date on which the media file of interest was captured, the user may thereafter still have to scroll through the gallery of media files in an effort to locate the media file of interest.

By way of example, a gallery may consist of a large number of media files that were captured on a few days and a much smaller number of media files that were captured on other days. While a user may select a point along the scrollbar that would appear to correlate approximately to the date on which the media file of interest was captured, the large number of media files captured on other days may cause the point along the scrollbar selected by the user to actually be substantially displaced from the day on which the media file of interest was captured. As such, the user may then be required to perform more scrolling through the gallery of media files in an effort to locate the media file of interest than anticipated by the user.

BRIEF SUMMARY

A method, apparatus and computer program product are provided in accordance with an example embodiment in order to facilitate the identification of one or more media files within a gallery of media files presented upon a display of a computing device, such as a mobile device. In this regard, the method, apparatus and computer program product of an example embodiment distinguish between different sessions of media files, such that a media file of a respective session may be more readily identified. By permitting a respective media file within a gallery of media files to be more efficiently identified, the method, apparatus and computer program product of an example embodiment may be particularly effective as the number of media files that are captured and stored continues to increase.

In an example embodiment, a method is provided that includes causing display of a gallery of media files. The gallery of media file is grouped into a plurality of sessions. Each session includes one or more media files. The method of this example embodiment also causes display of a scrollbar partitioned into a plurality of segments. Each segment corresponds to a respective session of media files. The method of this example embodiment further includes determining the media files of the gallery to be displayed in response to user input selecting a respective segment of the scrollbar. In this regard, the method determines the media files of the gallery to be displayed by determining the media files of the session corresponding to the respective segment of the scrollbar that is selected.

The method of an example embodiment causes the display of the scrollbar such that the segments of the scrollbar are sized in a manner proportional to the size of the corresponding session of media files. In an example embodiment, the method causes the display of the scrollbar such that the segments of the scrollbar are chronologically ordered based upon dates associated with the corresponding sessions of media files. In regards to the display of the scrollbar, the method of an example embodiment also causes the display of a marker along the scrollbar designating a beginning of a respective segment. In this regard, the method may cause the markers of two or more adjacent segments to be overlapped, such as in an instance in which at least one of the adjacent segments corresponds to a session having less than a predetermined number of media files. In this embodiment, the method may cause a change in the opacity or color of the markers that are overlapped relative to a marker that is not overlapped.

In another example embodiment, an apparatus is provided that includes at least one processor and at least one memory including computer program code with the at least one memory and computer program code configured to, with the processor, cause the apparatus to cause display of a gallery of media files. The gallery of media files is grouped into a plurality of sessions. Each session includes one or more media files. The at least one memory and the computer program code are also configured to, with the processor, cause the apparatus of this embodiment to cause display of a scrollbar partitioned into a plurality of segments. Each segment corresponds to a respective session of media files. The at least one memory and the computer program code are further configured to, with the processor, cause the apparatus of this embodiment to determine the media files of the gallery to be displayed in response to user input selecting a respective segment of the scrollbar. The media files of the gallery that are determined to be displayed include media files of the session corresponding to the respective segment of the scrollbar that is selected.

The at least one memory and the computer program code are configured to, with the processor, cause the apparatus of an example embodiment to cause the display of the scrollbar by causing the segments of the scrollbar to be sized in the manner proportional to a size of the corresponding session of media files. The at least one memory and the computer program code are configured to, with the processor, cause the apparatus of an example embodiment to cause the display of the scrollbar by causing the segments of the scrollbar to be chronologically ordered based upon dates associated with the corresponding sessions of media files. The at least one memory and the computer program code are also configured, with the processor, cause the apparatus of an example embodiment to cause the display of the scrollbar by causing the display of a marker along the scrollbar designating a beginning of a respective segment. In this example embodiment, the markers of two or more adjacent segments may be caused to be at least partially overlapped, such as in an instance in which at least one of the adjacent segments corresponds to a session having less than a predetermined number of media files. In an instance in which the markers of two or more adjacent segments are at least partially overlapped, the opacity or the color of the markers may be changed relative to a marker that is not overlapped.

In a further example embodiment, a computer program product is provided that includes at least one non-transitory computer-readable storage media having computer-executable program code portions stored therein with the computer-executable program code portions including program code instructions configured to cause display of the gallery of media files. The gallery of media files is grouped into a plurality of sessions. Each session includes one or more media files. The computer-executable program code portions also include program code instructions configured to cause display of a scrollbar partitioned into a plurality of segments. Each segment corresponds to a respective session of media files. The computer-executable program code portions further include program code instructions configured to determine the media files of the gallery to be displayed in response to user input selecting a respective segment of the scrollbar. In this regard, the program code instructions that are configured to determine the media files of the gallery to be displayed include program code instructions configured to determine media files of the session corresponding to the respective segment of the scrollbar that is selected.

The program code instructions configured to cause display of the scrollbar may include program code instructions configured to cause the segments of the scrollbar to be sized in a manner proportional to a size of the corresponding session of media files. The program code instructions configured to cause display of the scrollbar may include program code instructions configured to cause the segments of the scrollbar to be chronologically ordered based upon dates associated with the corresponding sessions of media files. The program code instructions configured to cause display of the scrollbar may include program code instructions configured to cause display of a marker along the scrollbar designating a beginning of a respective segment. In this example embodiment, the program code instructions configured to cause display of the scrollbar may include program code instructions configured to cause the markers of two or more adjacent segments to be at least partially overlapped, such as in an instance in which at least one of the adjacent segments corresponds to a session having less than a predetermined number of media files. The program code instructions configured to cause the markers of two or more adjacent segments to be at least partially overlapped may include program code instructions configured to cause a change in the opacity or the color of the markers that are overlapped relative to a marker that is not overlapped.

In yet another example embodiment, an apparatus is provided that includes means for causing display of a gallery of media files. The gallery of media files is grouped into a plurality of sessions. Each session includes one or more media files. The apparatus of this example embodiment also includes means for causing display of a scrollbar partitioned into a plurality of segments. Each segment corresponds to a respective session of media files. The apparatus of this embodiment further includes means for determining the media files of the gallery to be displayed in response to user input selecting a respective segment of the scrollbar. In order to determine the media files of the gallery to be displayed, the media files of the session corresponding to the respective segment of the scrollbar that is selected are determined.

BRIEF DESCRIPTION OF THE DRAWINGS

Figure 1:
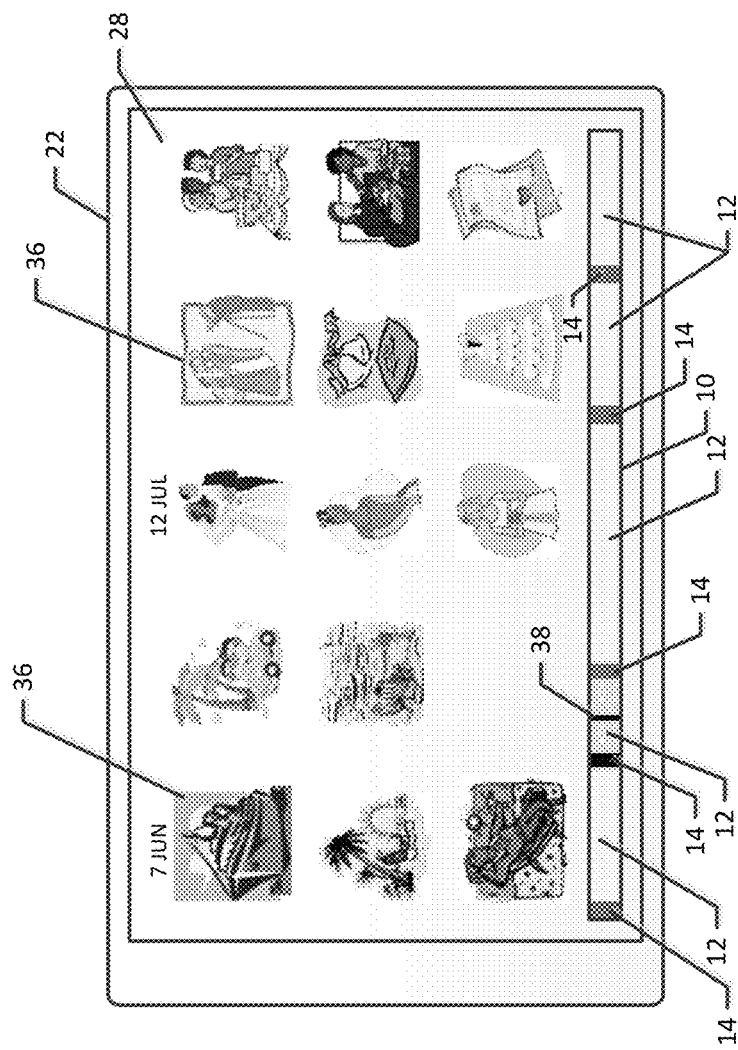
Figure 2:
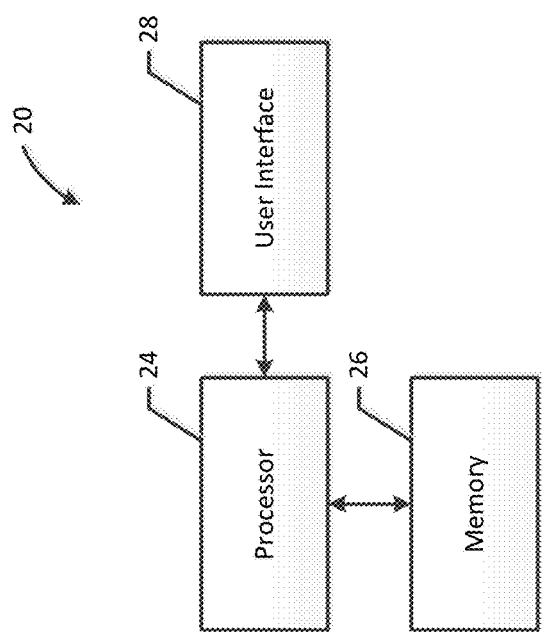
Figure 3:
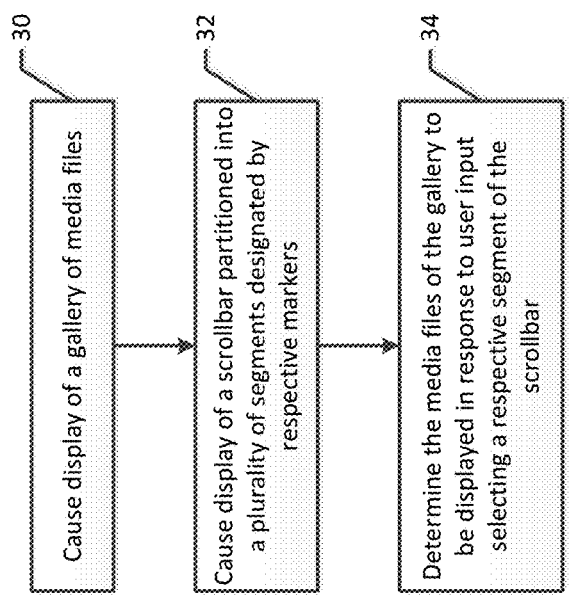
Figure 4:
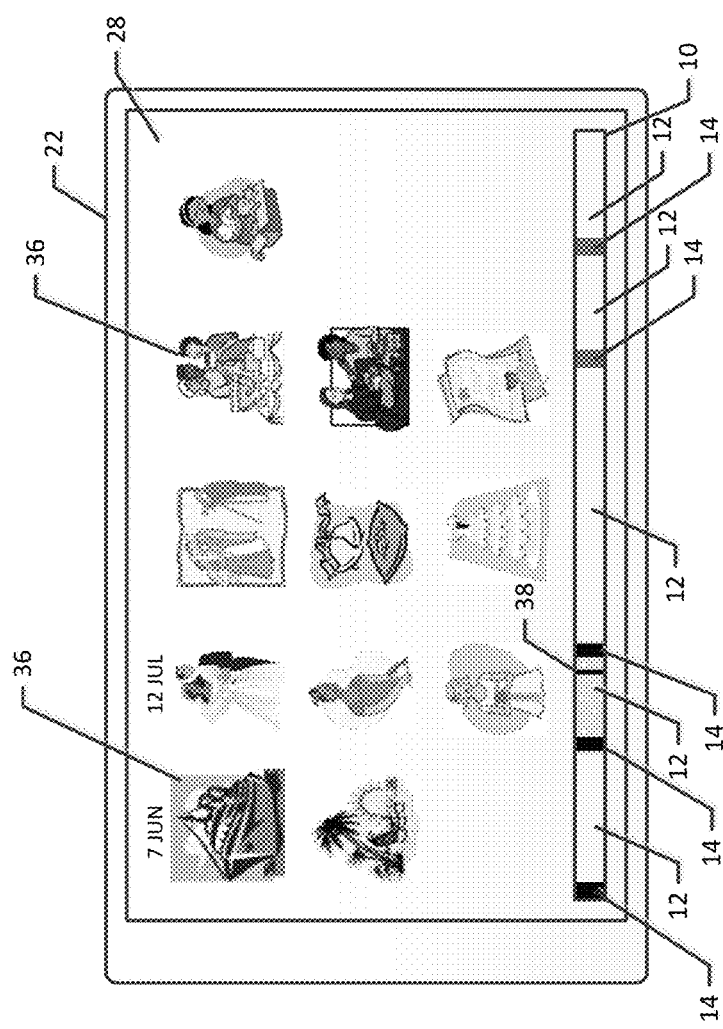
Figure 5:
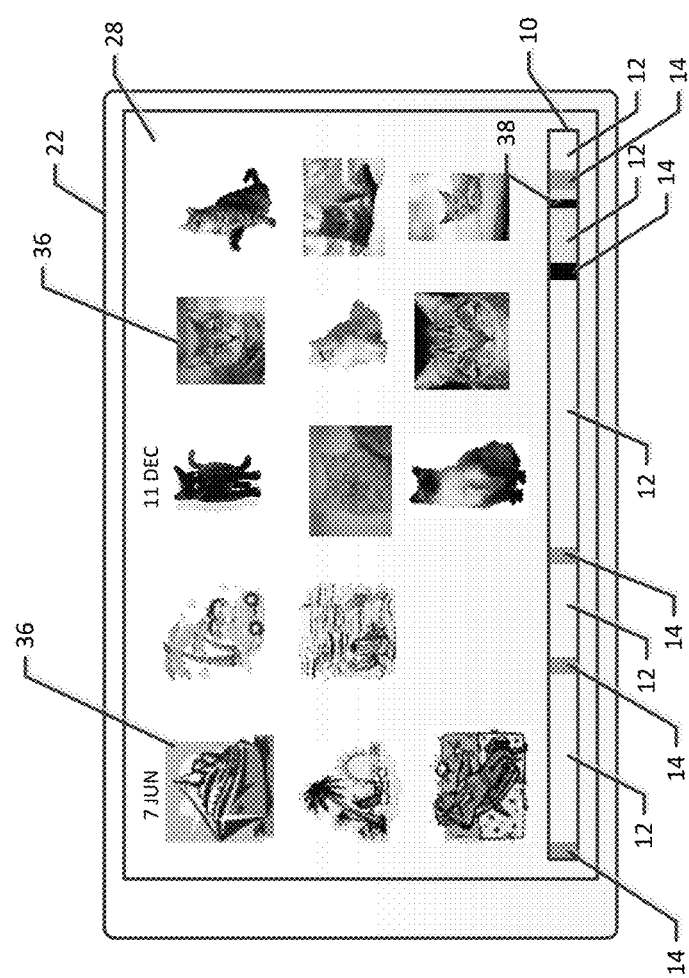
Figure 6:
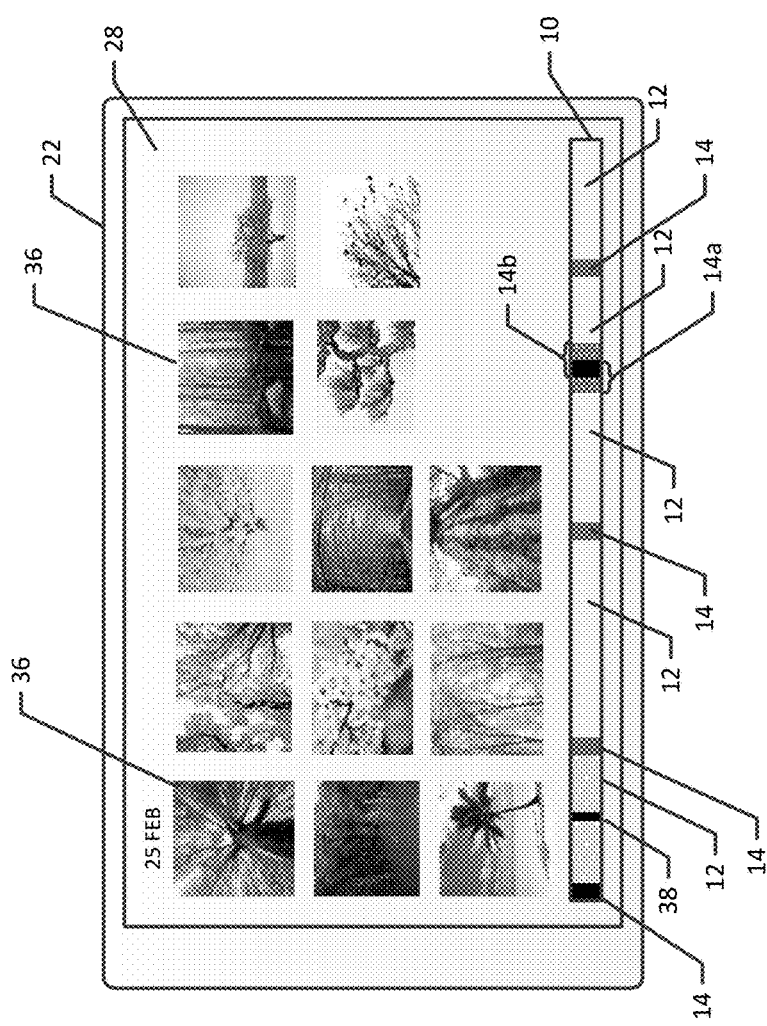

Having thus described certain embodiments of the invention in general terms, reference will now be made to the accompanying drawings, which are not necessarily drawn to scale, and wherein:

FIG. 1 depicts a user interface on which a plurality of media files are displayed in conjunction with a scrollbar in accordance with an example embodiment of the present invention;

FIG. 2 is a block diagram of an apparatus that may be configured to present a user interface in accordance with an example embodiment of the present invention;

FIG. 3 is a flowchart illustrating the operations performed, such as by the apparatus of FIG. 2, in accordance with an example embodiment of the present invention;

FIG. 4 depicts a user interface in which the gallery of media files has been scrolled within the same session of media files relative to that depicted in FIG. 1 in accordance with an example embodiment of the present invention;

FIG. 5 depicts a user interface in which the gallery of media files has been scrolled to a different session as indicated by the highlighting of a different segment of the scrollbar in accordance with an example embodiment of the present invention; and FIG. 6 depicts a user interface in which two markers associated with adjacent segments of the scrollbar are overlapped in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment of the present invention in order to facilitate user interaction with a gallery of media files. In this regard, the method, apparatus and computer program product provide a user interface that includes both a scroll bar and a gallery of media files. As shown in FIG. 1, the scroll bar 10 is partitioned into a plurality of segments 12, such as may be demarcated by respective markers 14. The segments into which the scroll bar is partitioned correspond to respective sessions into which the media files are grouped. In the illustrated embodiment, for example, the gallery of media files is grouped into sessions, each of which is associated with a particular day, such as June 7 or July 12. Alternatively, the sessions into which the media files of the gallery are grouped may be associated with a particular event, such as a holiday, a birthday, a vacation or the like. By partitioning the scroll bar into a plurality of segments, the user may more readily locate respective media files within the gallery by identifying the session into which the media file of interest would be grouped, and then navigating to the respective media file based upon the segment of the scroll bar that corresponds to the respective session. Thus, a user may more efficiently locate a media file that is of interest, even in an instance in which the gallery of media files includes a large number of media files that would otherwise be time-consuming to navigate.

The apparatus 20 of an example embodiment may be embodied by or associated with any of a variety of computing devices that include or are otherwise associated with a user interface that facilitates user interaction with a gallery of media files. For example, the computing device may be a mobile terminal, such as a personal digital assistant (PDA), mobile telephone, smart phone, companion device, for example, a smart watch, pager, mobile television, gaming device, laptop computer, camera, tablet computer, touch surface, video recorder, audio/video player, radio, electronic book or any combination of the aforementioned, and other types of voice and text communications systems. Alternatively, the computing device may be a fixed computing device, such as a personal computer, a computer workstation, a kiosk or the like. Still further, the apparatus may be embodied by or associated with a plurality of computing devices that are in communication with or otherwise networked with one another such that the various functions performed by the apparatus may be divided between the plurality of computing devices that operate in collaboration with one another. For purposes of illustration, but not of limitation, an apparatus embodied by a mobile terminal 22, such as a smart phone, is depicted and will be described herein. However, the apparatus may be embodied by other types of computing devices as noted above.

Regardless of the type of computing device that embodies or is otherwise associated with the apparatus 20, the apparatus of an example embodiment is depicted in FIG. 2. The apparatus may include, be associated with or otherwise in communication with a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface that may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

Referring now to FIG. 3, the operations performed, such as by the apparatus 20 of FIG. 2, in accordance with an example embodiment of the present invention are depicted. As shown in block 30, the apparatus may include means, such as the processor 24, the user interface 28 or the like, for causing display of a gallery of media files. The gallery may include a variety of different types of media files including, for example, still images, video files, audio recordings or the like. In addition, the media files may be visually represented in various manners. As shown, for example, in FIG. 1, the media file may be represented by icons, thumbnails or other visual representations 36 of the respective media file. By way of example, a still image may be represented by a reduced size representation of the still image, while a video file may be represented by a reduced size representation of one frame, such as the first frame or a representative frame, of the video file.

The gallery of media files is grouped into a plurality of sessions with each session including one or more media files. The sessions into which the media files are grouped may be defined in various manners, such as based upon the manner in which the media files are captured. By way of example, during the capture of the media files, a user may designate the commencement of a session, such as with a predefined user input, with all media files captured until the conclusion of the session being considered to comprise the respective session. In this example, the session may be concluded in response to user input directing the conclusion of the session. Alternatively, the session may be concluded in response to a predetermined period of time having elapsed following the commencement of the session or in response to a predetermined period of time having elapsed since the capture of the most recent media file. Still further, the session may be concluded in response to a determination that the computing device embodying the apparatus has been fixed in position and has not moved for a predetermined period of time. Regardless of the manner in which the session is defined, one or more media files that are captured during a session are associated with the respective session. As shown in FIG. 1, the session may be associated with a particular day on which the media files were captured, such as June 7 or July 12. Alternatively, the session may be associated with a particular event, such as a birthday, a particular holiday, a vacation or the like.

As shown in block 32 of FIG. 3, the apparatus 20 also includes means, such as the processor 24, the user interface 28 or the like, for causing the display of a scroll bar 10 concurrent with the display of the gallery of media files. As shown in FIG. 1, the scroll bar is partitioned into a plurality of segments 12. Each segment corresponds to a respective session of media files.

As shown in FIG. 1, the apparatus 20, such as the processor 24, the user interface 28 or the like, is configured in accordance with an example embodiment in order to cause the display of a marker 14 along the scroll bar designating the beginning of a respective segment 12. With respect to the embodiment of FIG. 1, the scroll bar is partitioned into five segments, the beginning of each of which is designated by a respective marker. Although a marker may be visually represented in various manners, the marker of the illustrated embodiment extends across the scroll bar 10, such as in a vertical direction in the orientation depicted in FIG. 1, and has a predefined width, such as a width of eight columns of pixels. In addition, a marker may be visually represented so as to have a predetermined opacity and/or a predefined color. In the embodiment illustrated in FIG. 1 in which each session into which the media files are grouped is associated with a respective date, each segment into which the scroll bar is partitioned and, as a result, each marker designating the beginning of a respective segment is correspondingly associated with the date of the respective session, such as June 7 or July 12.

In an embodiment in which the sessions into which the media files are grouped are associated with a corresponding time, such as a particular day or a particular event or holiday that occurs on a specific day, the apparatus 20, such as the processor 24, the user interface 28 or the like, may be configured in order to cause the segments 12 of the scroll bar 10 to be chronologically ordered based upon the dates associated with the corresponding sessions into which the media files are grouped. By way of example, the segment of the scroll bar corresponding to the session of media files captured on June 7 precedes the segment of the scroll bar corresponding to the session of media files captured on July 12, and both of which precede the segments of the scroll bar corresponding to the sessions of media files captured on December 7 and December 11 as described below. Thus, the chronological ordering of the segments along the scroll bar facilitates the identification by user of the respective segment in which a media file of interest is grouped.

The apparatus 20, such as the processor 24, the user interface 28 or the like, is also be configured in an example embodiment to cause the segments 12 of the scroll bar 10 to be sized in a manner proportional to the size of the corresponding sessions of media files. The size of the corresponding session of media files may be defined in various manners including the number of media files grouped into the respective session relative to the total number of media files in the gallery or the cumulative size, such as in bytes, of the media files grouped in a session relative to the cumulative size of the media files in the gallery. By sizing the segments of the scroll bar proportional to the size of the corresponding sessions of media files, those sessions of media files that are larger have segments that are proportionately larger along the length of the scroll bar, while sessions of media files that are smaller have corresponding segments that are proportionately smaller along the length of the scroll bar. With respect to the example embodiment of FIG. 1, the third of the five segments is longer than the other four segments such that the size of the session of media files corresponding to the third segment is larger than the size of the sessions of the media files corresponding to the other segments. By reference to the size of the segments into which the scroll bar is partitioned, a user may quickly gauge the relative sizes of the sessions of media files and may correspondingly determine the general proportion of the gallery of media files that is comprised by a respective session of media files. Because of proportional relationship of the segments to the size of the gallery, the user is able to scroll along the scroll bar in a manner that allows the media files to be correspondingly scrolled across the display in a relatively smooth manner, thereby avoiding disconcerting variations in a scrolling speed at which the media files move across the display when transitioning from one session to another.

As shown in block 34 of FIG. 3, the apparatus 20 also includes means, such as the processor 24 or the like, for determining the media files of the gallery to be displayed in response to user input selecting a respective segment 12 of the scroll bar 10. In this regard, the apparatus, such as the processor, is configured to determine the media files of the gallery to be displayed by determining the media files of the session corresponding to the respective segment of the scroll bar that is selected. More particularly, the apparatus, such as the processor, is configured to determine the segment of the scroll bar that has been selected by the user and, in response, to determine the session of media files that corresponds to the respective segment.

In regards to the user input selecting a respective segment 12 of the scroll bar 10, the user input may be provided in various manners. With respect to an embodiment in which the user interface 28 includes a touch screen display, the user may simply touch a respective segment along the scroll bar in order to select the respective segment. Alternatively, a user may position a cursor upon a respective segment of the scroll bar and may then provide input, such as in the form of a mouse click or key press, to select the respective segment. The user input may also serve to identify the media files within the session corresponding to the selected segment that are to be displayed. In this regard, the processor of an example embodiment is configured to determine the relative location of the user input with respect to the segment and the media files of the corresponding session that are located at a corresponding relative position within the session may be identified as the media files from which the presentation will commence. For example, user input that is detected proximate the marker 14 designating the beginning of a segment may cause the media files that are presented upon the display to begin with the first media files of the corresponding session. Alternatively, user input that is detected near the end of the respective segment may cause the media files that are presented upon a display to begin with the last media files of the corresponding session. Following the selection of a segment and the display of media files from the corresponding session, additional user input may be provided so as to scroll through the media files of the gallery in either the forward or rearward directions beginning with the media files of the session corresponding to the segment that was selected by the user input.

The location of the user input within a respective segment 12 may be visually represented by a location indicator 38, such as a thin vertical line, that visually marks the location within the respective segment that was selected by the user input. The location indicator may be relocated relative to the scroll bar 12 upon the receipt of additional user input, such as user input in the form of the selection of a different segment or a different location within the same segment or in response to scrolling in either the forward or rearward directions. By viewing the location indicator relative to the scroll bar and relative to the segment that includes the location indicator, the location indicator provides an indication to the user as to the relative location within the gallery of media files as a whole and within a respective session of the gallery of media files from which the display of the media files currently begins.

By way of example, the location indicator 38 of FIG. 1 indicates that the media files that are presented begin with the media files that are proximate the midpoint of the session corresponding to the segment 12 for June 7. As shown in FIG. 4, additional user input had been provided, such as in the form of a scrolling input in the forward or rightward direction or the selection of a later portion of the same segment, such that the location indicator is now positioned further to the right within the same segment. As such, the media files that are presented begin with media files from the same session, but with the media files that were captured at a later point in time within the session. Still further, user input may be provided that causes media files of a different session to be presented. For example, user input may be provided that selects a different segment along the scroll bar with the media files that are displayed then beginning with the media files from the session corresponding to the newly selected segment. As shown in FIG. 5, for example, the fourth and fifth segments may correspond to a session in which the media files were captured on December 7 and a session in which the media files were captured on December 11. In this example embodiment, the user input has selected the segment corresponding with the session in which the media files were captured on December 7 and, more particularly, has selected a portion of the segment that is near the end of the segment. Thus, the media files that are presented upon the display begin with media files captured during the session on December 7 and, more particularly, with the media files captured during the latter portion of the session on December 7.

In addition to the presentation of the location indicator 40, the segment 12 that has been selected and that corresponds to the session that includes the media files from which the display of the gallery begins may be highlighted. In this regard, the apparatus 20, such as the processor 24, the user interface 28 or the like, may be configured to highlight the selected segment in various manners, such as by visually representing the selected segment in a different color or a different gray level relative to the other segments. As such, the user may quickly determine the selected segment and its relative position of the corresponding session with respect to the entire gallery of media files.

As indicated above, the segments 12 of the scroll bar 10 may be sized in a manner proportional to the size of the corresponding sessions of media files. In some instances, however, one or more sessions of media files may be relatively small relative to the size of the gallery of media files. In these instances, the apparatus 20, such as the processor 24, the user interface 28 or the like, of an example embodiment may be configured to cause two or more of the markers 14 to be displayed in an at least partially overlapping manner. In this regard, the marker for a segment corresponding to a session having relatively few media files may be at least partially overlapped by the marker for the next successive segment. By way of example, two or more markers may be at least partially overlapped in an instance in which the size of a segment corresponding to one of the markers is determined, such as on a proportionality basis relative to the size of the gallery, to be smaller than the width of the marker itself or to otherwise have a size that is less than a predefined minimum threshold. Alternatively, two or more markers may be at least partially overlapped in an instance in which one of the markers is associated with a segment corresponding to a session having less than a predetermined number of media files.

While the markers 14 may be completely overlapped in some instances, the markers may be partially overlapped in other embodiments. As shown in FIG. 6, for example, the marker 14a of a preceding segment may be partially overlapped with the marker 14b for a successive segment in an instance in which the media files of the session corresponding to the preceding segment are small relative to the number of media files in the gallery. In this example embodiment, the markers are partially overlapped in that a portion of each marker is presented without any overlap, while another portion of each marker overlaps the other. More particularly, in an instance in which the scroll bar 10 presents a chronological ordering of the segments 12, the leftmost portion of the marker for the preceding session may be presented without overlap and the rightmost portion of the marker associated with the successive segment may be presented without overlap, while the rightmost portion of the marker for the preceding segment and the leftmost portion of the marker for the successive segment may overlap with one another.

The apparatus 20, such as the processor 24, the user interface 28 or the like, may be configured to cause the overlapped portion of the markers 14 to be visually designated in various manners including by a change in opacity or a change in color relative to the opacity or color of a marker that is not overlapped. As such, a user is able to distinguish the partially overlapping marker and may separately select each of the partially overlapped markers in order to cause the media files of the session corresponding thereto to be presented. However, the at least partial overlap of the markers permits the scroll bar 10 to be partitioned in a manner that more accurately portrays the relative size of the different segments including segments that correspond to sessions having very few media files with the markers for the segments corresponding to segments having very few media files being partially overlapped with the markers for the successive segments. While the embodiment depicted in FIG. 6 and described above includes two markers that are partially overlapped, three or more markers may be partially overlapped in a comparable manner in other embodiments, such as in instances in which a plurality of adjacent segments correspond to sessions that each have relatively few media files.

As described above, a method, apparatus 20 and computer program product are provided so as to facilitate the identification of one or more media files within a gallery of media files presented upon a display of a computing device, such as a mobile terminal 22. In this regard, the method, apparatus and computer program product of an example embodiment distinguish between different sessions of media files by partitioning a scroll bar 10 into corresponding segments 12, such that a media file of a respective session may be more readily identified by selection of the corresponding segment. By permitting a respective media file within a gallery of media files to be more efficiently identified, the method, apparatus and computer program product of an example embodiment may be particularly advantageous as the number of media files that are captured and stored continues to increase. As such, the method, apparatus and computer program product provide numerous technical advantages including the conservation of processing resources and the associated power consumption otherwise expended to support the display of the visual representations 36 of various media files while a user searches for a media file of interest by configuring the scroll bar 10 so as permit the user to locate a desired media file in a more expeditious and efficient manner.

In addition to supporting user interaction with a gallery of media files, the computing device may be configured to support one or more other functions. For example, the computing device of an example embodiment may also support a mapping application so as to present maps or otherwise provide mapping information. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or global positioning system (GPS) data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database can be a master geographic database, but in alternate embodiments, the client side geographic database can represent a compiled navigation database that can be used in or with the computing device to provide navigation and/or map-related functions. For example, the geographic database can be used with the end user device to provide an end user with navigation features. In such a case, the geographic database can be downloaded or stored on the computing device, such as in applications, or the computing device can access the geographic database through a wireless or wired connection (such as via a server and/or a communication network), for example.

In one embodiment, the computing device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. Thus, in addition to accessing various media files as described above, the user can use the computing device of an example embodiment for navigation and map functions such as guidance and map display, for example, and for determination of one or more personalized routes or route segments based on one or more calculated and recorded routes, according to example embodiments.

As described above, FIG. 3 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing display of a gallery of media files, wherein the gallery of media files is grouped into a plurality of sessions, and wherein each session comprises one or more media files;
    causing display of a scroll bar partitioned into a plurality of segments with the segments presented in a chronological order along the scroll bar, wherein causing display of the scroll bar comprises causing display of a marker along the scroll bar designating a beginning of a respective segment and causing the markers of two or more adjacent segments to be at least partially overlapped with an opacity or a color of the markers that are overlapped being changed relative to a marker that is not overlapped, each segment corresponding to a respective session of media files and the media files of a respective session being associated with different portions of the segment including portions of the segment subsequent to the marker, wherein each segment is presented by the scroll bar so as to have a size along the scroll bar that is dependent upon a size of the respective session; and
    determining the media files of the gallery to be displayed in response to user input selecting a respective segment of the scroll bar, wherein determining the media files of the gallery to be displayed comprises determining media files of the session corresponding to the respective segment of the scroll bar that is selected including determining one or more media files of the session associated with a portion of the segment subsequent to the marker in response to user input selecting the portion of the segment subsequent to the marker, and wherein the media files of the session that are determined to be displayed begin with a different media file depending upon the portion of the segment selected by the user input.

2. A method according to claim 1 wherein causing display of the scroll bar comprises causing the segments of the scroll bar to be sized in a manner proportional to the size of the corresponding session of media files.

3. A method according to claim 1 wherein causing display of the scroll bar comprises causing the segments of the scroll bar to be chronologically ordered based upon dates associated with the corresponding sessions of media files.

4. A method according to claim 1 wherein the marker of a respective segment comprises an image on the scroll bar designating the beginning of the respective segment on the scroll bar.

5. A method according to claim 1 wherein causing the markers of two or more adjacent segments to be at least partially overlapped comprises causing the markers of adjacent segments to be overlapped in an instance in which at least one of the adjacent segments corresponds to a session having less than a predetermined number of media files.

6. A method according to claim 1 wherein causing the markers of two or more adjacent segments to be at least partially overlapped comprises causing the markers of adjacent segments to be at least partially overlapped in an instance in which a size of the segment corresponding to one of the markers is smaller on a proportional basis than a width of the marker or is less than a predefined minimum threshold.

7. An apparatus comprising at least one processor and at least one memory including computer program code, the at least one memory and computer program code configured to, with the processor, cause the apparatus to at least:
    cause display of a gallery of media files, wherein the gallery of media files is grouped into a plurality of sessions, and wherein each session comprises one or more media files;
    cause display of a scroll bar partitioned into a plurality of segments with the segments presented in a chronological order along the scroll bar, wherein the scroll bar is caused to be displayed by causing display of a marker along the scroll bar designating a beginning of a respective segment and by causing the markers of two or more adjacent segments to be at least partially overlapped with an opacity or a color of the markers that are overlapped being changed relative to a marker that is not overlapped, each segment corresponding to a respective session of media files and the media files of a respective session being associated with different portions of the segment including portions of the segment subsequent to the marker, wherein each segment is presented by the scroll bar so as to have a size along the scroll bar that is dependent upon a size of the respective session; and
    determine the media files of the gallery to be displayed in response to user input selecting a respective segment of the scroll bar, wherein the media files of the gallery that are determined to be displayed comprise media files of the session corresponding to the respective segment of the scroll bar that is selected and the one or more media files of the session that are determined to be displayed are associated with a portion of the segment subsequent to the marker in response to the user input selecting the portion of the segment subsequent to the marker, and wherein the media files of the session that are determined to be displayed begin with a different media file depending upon the portion of the segment selected by the user input.

8. An apparatus according to claim 7 wherein the at least one memory and the computer program code are configured to, with the processor, cause the apparatus to cause display of the scroll bar by causing the segments of the scroll bar to be sized in a manner proportional to the size of the corresponding session of media files.

9. An apparatus according to claim 7 wherein the at least one memory and the computer program code are configured to, with the processor, cause the apparatus to cause display of the scroll bar by causing the segments of the scroll bar to be chronologically ordered based upon dates associated with the corresponding sessions of media files.

10. An apparatus according to claim 7 wherein the marker of a respective segment comprises an image on the scroll bar designating the beginning of the respective segment on the scroll bar.

11. An apparatus according to claim 7 wherein the at least one memory and the computer program code are configured to, with the processor, cause the apparatus to cause the markers of two or more adjacent segments to be at least partially overlapped by causing the markers of adjacent segments to be overlapped in an instance in which at least one of the adjacent segments corresponds to a session having less than a predetermined number of media files.

12. A apparatus according to claim 7 wherein the at least one memory and the computer program code are configured to, with the processor, cause the apparatus to cause the markers of two or more adjacent segments to be at least partially overlapped by causing the markers of adjacent segments to be at least partially overlapped in an instance in which a size of the segment corresponding to one of the markers is smaller on a proportional basis than a width of the marker or is less than a predefined minimum threshold.

13. A computer program product comprising at least one non-transitory computer-readable storage medium having computer-executable program code portions stored therein, the computer-executable program code portions comprising program code instructions configured to:

cause display of a gallery of media files, wherein the gallery of media files is grouped into a plurality of sessions, and wherein each session comprises one or more media files;

cause display of a scroll bar partitioned into a plurality of segments with the segments presented in a chronological order along the scroll bar, wherein the scroll bar is caused to be displayed comprises causing display of a marker along the scroll bar designating a beginning of a respective segment and causing the markers of two or more adjacent segments to be at least partially overlapped with an opacity or a color of the markers that are overlapped being changed relative to a marker that is not overlapped, each segment corresponding to a respective session of media files and the media files of a respective session being associated with different portions of the segment including portions of the segment subsequent to the marker, wherein each segment is presented by the scroll bar so as to have a size along the scroll bar that is dependent upon a size of the respective session; and determine the media files of the gallery to be displayed in response to user input selecting a respective segment of the scroll bar, wherein the program code instructions configured to determine the media files of the gallery to be displayed comprise program code instructions configured to determine media files of the session corresponding to the respective segment of the scroll bar that is selected and the one or more media files of the session that are determined to be displayed are associated with a portion of the segment subsequent to the marker in response to the user input selecting the portion of the segment subsequent to the marker, and wherein the media files of the session that are determined to be displayed begin with a different media file depending upon the portion of the segment selected by the user input.

14. A computer program product according to claim 13 wherein the program code instructions configured to cause display of the scroll bar comprise program code instructions configured to cause the segments of the scroll bar to be sized in a manner proportional to the size of the corresponding session of media files.

15. A computer program product according to claim 13 wherein the program code instructions configured to cause display of the scroll bar comprise program code instructions configured to cause the segments of the scroll bar to be chronologically ordered based upon dates associated with the corresponding sessions of media files.

16. A computer program product according to claim 13 wherein the marker of a respective segment comprises an image on the scroll bar designating the beginning of the respective segment on the scroll bar.

17. A computer program product according to claim 13 wherein the program code instructions configured to cause the markers of two or more adjacent segments to be at least partially overlapped comprise program code instructions configured to cause the markers of adjacent segments to be at least partially overlapped in an instance in which a size of the segment corresponding to one of the markers is smaller on a proportional basis than a width of the marker or is less than a predefined minimum threshold.

* * * * *